United States Patent [19]

Wuerker et al.

[11] 4,134,249
[45] Jan. 16, 1979

[54] MULCHING TYPE OF LAWN MOWER

[75] Inventors: Charles A. Wuerker; Gary C. Steingraber; Neill C. Woelffer, all of Racine, Wis.

[73] Assignee: Jacobsen Manufacturing Company, Racine, Wis.

[21] Appl. No.: 771,928

[22] Filed: Feb. 25, 1977

[51] Int. Cl.² ............................................. A01D 55/18
[52] U.S. Cl. ........................................ 56/255; 56/295; 56/320.1
[58] Field of Search ....................... 56/255, 295, 320.1

[56] References Cited
U.S. PATENT DOCUMENTS

| 2,265,545 | 12/1941 | Phelps | 56/320.1 |
| 2,836,029 | 5/1958 | Johnson | 56/295 |
| 2,963,842 | 12/1960 | Estes | 56/320.1 |
| 3,085,386 | 4/1963 | Slemmons | 56/295 X |
| 3,226,920 | 1/1966 | Gilbertson | 56/255 |
| 3,378,995 | 4/1968 | Welsh | 56/255 X |
| 3,531,923 | 10/1970 | De Lay | 56/255 X |
| 3,577,871 | 5/1971 | Engler | 56/255 |
| 3,608,291 | 9/1971 | Kidd | 56/320.1 |

Primary Examiner—Louis G. Mancene
Assistant Examiner—Daniel J. Leach
Attorney, Agent, or Firm—Arthur J. Hansmann

[57] ABSTRACT

A mulching type of lawn mower including a mower housing and a cutter blade therein and with vertically adjustable wheels on the housing. A comb member with a drag flap or panel is attached to the housing at the rear thereof and extends downwardly toward the ground in two sections, with the forward one of the two sections being shorter than the rearward one, and with the two sections or panels terminating in lower edges which brush the cut grass clippings and thereby comb them into the turf.

9 Claims, 5 Drawing Figures

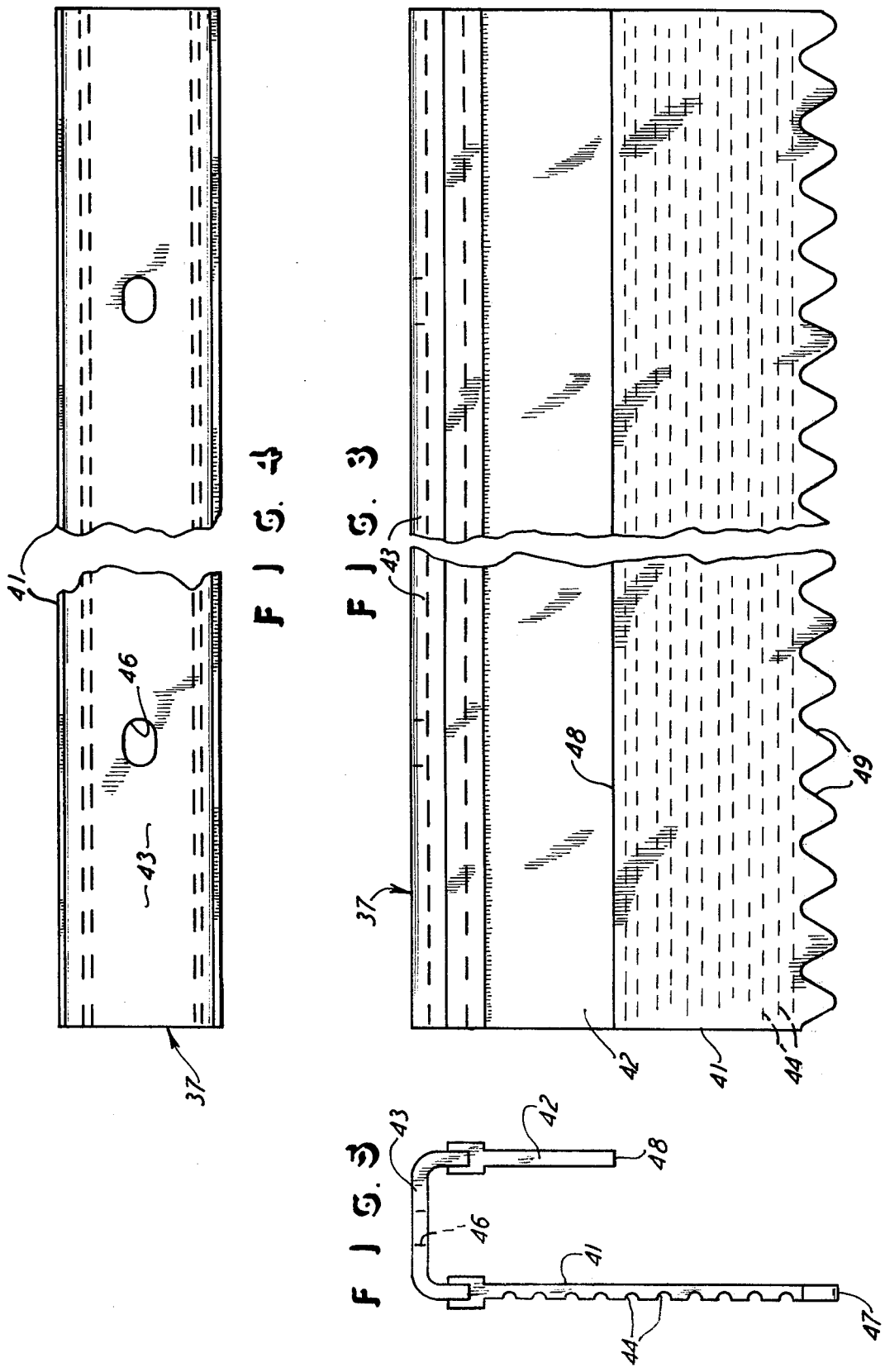

MULCHING TYPE OF LAWN MOWER

This invention relates to a mulching type of lawn mower, and, more particularly, it relates to a lawn mower of the rotary type wherein the cut grass, leaves, or the like are cut into fine particles and are combed or brushed into the grass so that there is no need for the cuttings to be collected in a catcher.

BACKGROUND OF THE INVENTION

Mulching types of lawn mowers are generally not new in the industry, and the prior art is already aware of some constructions of mulching types of mowers. These mowers are of a nature where the grass clippings or the leaves or the like which are engaged by the mower cutters are not permitted to be blown into a catcher or even simply beyond the lateral confines of the housing itself, but instead the cuttings are dropped below the housing and are then left on the lawn to gravitate into the turf and to ultimately decay and disappear. As such, the prior art type of mulching mower does not require that the clippings be caught in a catcher or that they be raked from the lawn, but instead the clippings are left on the lawn and are ultimately assimilated by the lawn itself. A prior art example of a mower which has a mulching type of action is found in U.S. Pat. No. 2,737,772 where the cutter member is arranged so that the clippings are cut into short lengths and can therefore be digested by the lawn. Other examples of U.S. Patents which show housing and/or cutter arrangements in mulching rotary mowers are U.S. Pat. Nos. 2,576,884; 2,675,662; 2,719,296; 2,809,488; 2,857,727; 2,973,614; 3,003,298; and 3,085,386.

In addition to the above with regard to arrangements of housings and/or cutters for rotary mowers, the prior art is already aware of various flaps or guards which extend across the rear of a rotary mower for the purpose of protecting the user from injury, and though that is not the purpose in the present invention, those prior art arrangements are referred to herein and are found in examples of U.S. patents such as U.S. Pat. Nos. 2,514,407 and 2,659,191 and 2,692,466 and 2,963,842 and 2,973,613 and 3,378,995 and 3,524,307 and 3,555,793 and 3,727,386. The aforementioned list is representative of patents which have members extending rearwardly of the mower, though those members are primarily for safety purposes and are therefore different from the herein disclosed rearwardly disposed flaps as described hereinafter.

Accordingly, the present invention is an improvement upon the prior art type of mulching mowers, and particularly, the present invention provides a mulching mower wherein the clippings are cut into short lengths and are then brushed into the remaining grass or turf and are left to decay and are not left on top of the grass. As such, the present invention provides a mulching mower which eliminates the necessity for collecting the clippings in a bag or for raking the grass after it is cut in order to remove the cut clippings.

Still further, the present invention provides a mulching type of lawn mower wherein the mower is provided with two flaps at the rear thereof and with the flaps being of different elevations so that there is a forwardly located flap at a higher elevation for primary combing of the cut grass into the turf and the trailing flap extends to a lower elevation for additional combing of the clippings into the turf. Also, in the present invention, the two flaps are of a different flexibility, and thus the lower extending flap will flex or bend more when it is encountered by the ground. Still further, the present invention provides a mulching type mower having adjustable wheels and with the flaps being arranged to accommodate the wheel adjustment, such as by having a flexible flap extending downwardly to the ground but never being engaged by the ground even at the time when the mower housing is in its lowest position.

Still further, the present invention provides a mulching type of lawn mower wherein there are two grass clipping combing panels disposed at the rear end of the mower, and one of the panels is flexible for adjustable engagement of the ground, and the mower itself is provided with adjustable wheels and with a plurality of cutters which cut the clippings into short lengths. That is, the entire mower is arranged with the combination of elements suitable and adaptable for disposing the clippings in the turf and thereby avoiding the requirements of either catching the clippings or raking the clippings from the turf. As such, the cutter is arranged to cut the clippings into short lengths and to blow the clippings downwardly into the turf, and the trailing panel finally combs the clippings into the turf.

Other objects and advantages will become apparent upon reading the following description in light of the accompanying drawings.

BRIEF DESCRIPTION OF THE DRAWINGS

FIG. 3 is a rear elevational view of the combing panels shown in FIG. 1.

FIG. 4 is a top plan view of FIG. 3.

FIG. 5 is an end elevational view of FIG. 3.

DETAILED DESCRIPTION OF THE PREFERRED EMBODIMENT

Figure 2:
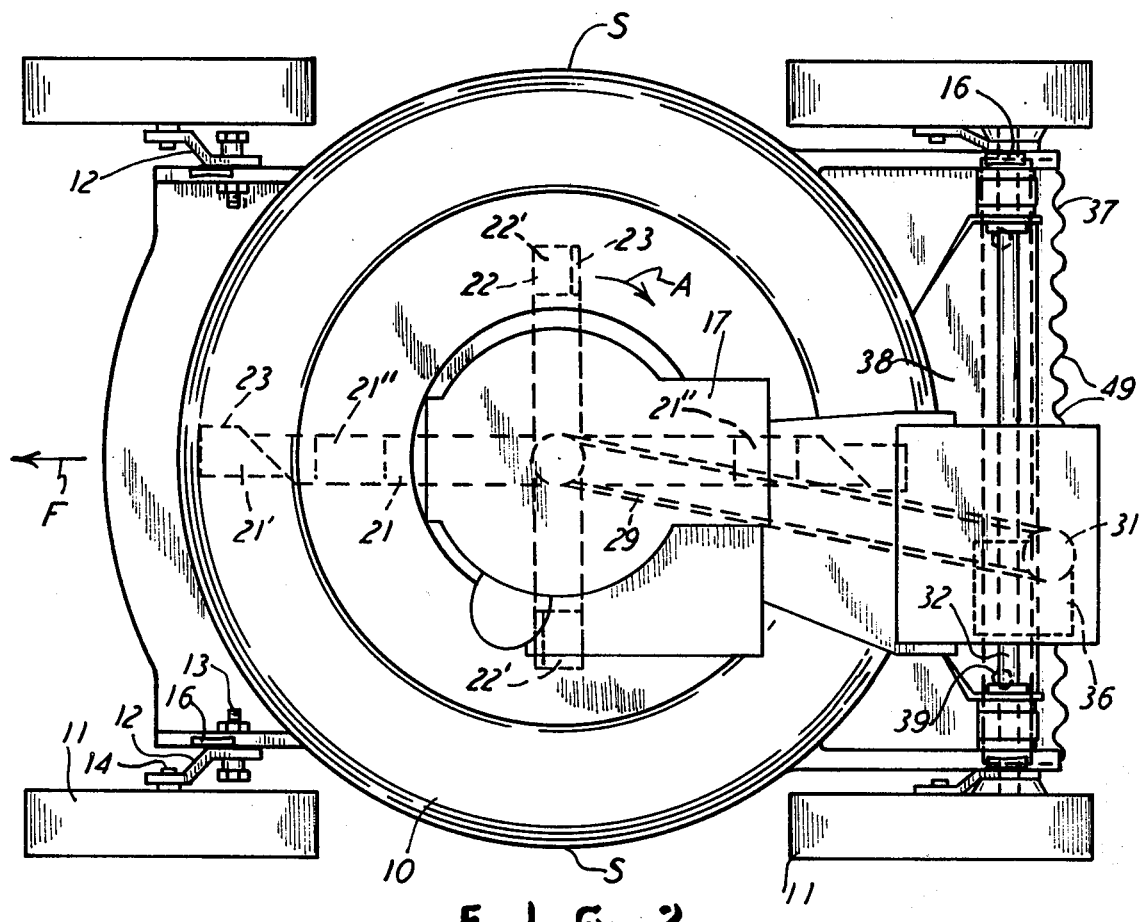
FIG. 2 is a top plan view thereof.
Figure 1:
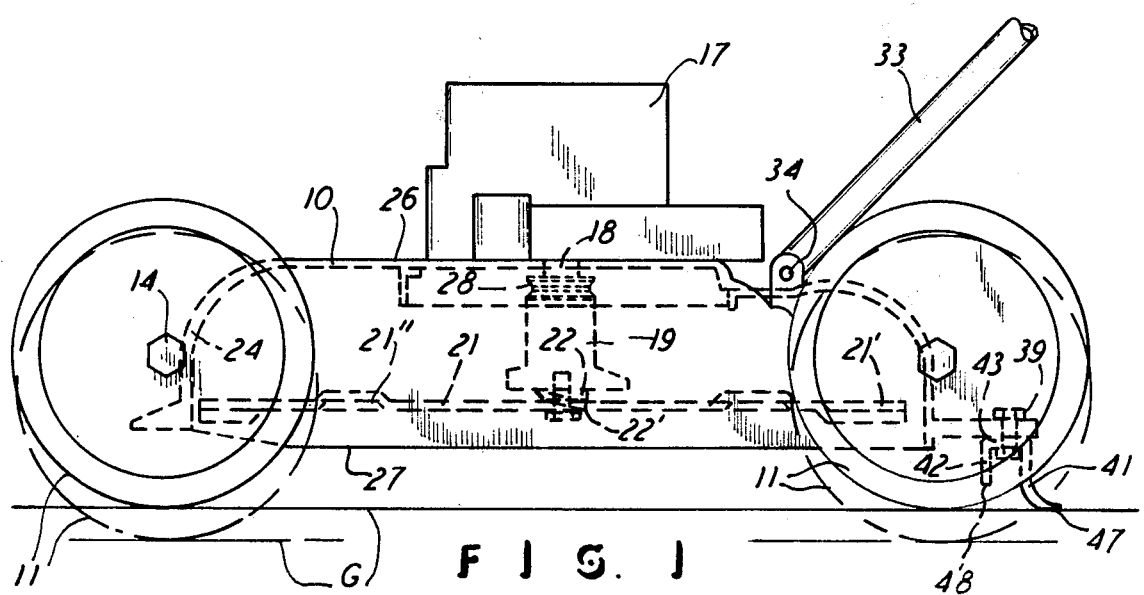
FIG. 1 is a side elevational view of a mulching type mower made according to this invention.

FIGS. 1 and 2 show a generally conventional type of rotary lawn mower having a usual housing 10 and four vertically adjustable ground wheels 11 connected thereto. The wheels 11 are connected to the housing 10 through crank arms 12 which are pivotal on the housing through bolts 13, and wheel axles 14 are connected to the extending ends of the crank arms 12 and serve as the axles in the Aorm of the bolt 14, as seen between FIGS. 1 and 2. Thus, in the usual and conventional arrangement, the cranks 12 can be rotated about the horizontal axes of the mounting bolts 13, and thus the respective wheels 11 can be swung up and down relative to the housing 10 for elevating the housing 10 relative to the ground line designated G, in FIG. 1. Thus the dot-dash line of FIG. 1 shows the two left side wheels 11 in a lowered position relative to the repositioning of the ground line G, all as indicated in FIG. 1. Accordingly, an adjustable lever arm 16 is suitably affixed with the crank arm 12 and can be retained in a selected set position with the housing 10, all in a conventional manner, so that the crank arms 12 can be swung about their pivot bolts 13 for the vertical adjustment of the wheels 11, in the conventional arrangement. For purposes of this disclosure and description, it need only be understood that the wheels 11 are vertically adjustable, in any conventional arrangement.

The housing 10 is therefore of a circular configuration, as viewed in FIG. 2, and it has the usual prime mover or engine 17 mounted thereon, and the engine shaft 18 extends into the housing 10 and carries a blade mounting hub 19 which supports a first and long blade 21 and a second and shorter blade 22. FIG. 2 shows that the blades 21 and 22 are disposed at right angles to each other, and the extending ends of each of the two blades 21 and 22, which are in bar form, have cutting edges at the locations designated 23, and thus the blades rotate in the direction of the arrow designated A in FIG. 2. FIG. 1 shows that the two blades 21 and 22 are at a slightly different elevation, and the longer blade 21 is at the lower elevation and extends to the outer limit of the housing 10 and to a location slightly spaced from the depending housing skirt 24 which is an endless skirt extending in a circular pattern and defining the lower and outer wall of the housing 10, and there is no grass clipping outlet or opening in the housing 10, nor in its skirt 24, and thus the grass clippings produced by the rotation of the blades 21 and 22 are not blown laterally of the housing 10 but are blown to below the housing 10.

That is, the prime mover will of course rotate the blades 21 and 22, and the longer and lower blade 21 will initially engage the grass and cut the grass into a first length of a grass clipping, and the clippings will be confined in the housing 10 and will be actually directed upwardly therein toward the deck or upper wall designated 26, and the clippings will eventually be engaged by the recutter or second cutter 22, and the clippings are then cut into shorter lengths. With this arrangement, and as mentioned in more detail hereinafter, the mower is arranged to be of the mulching type in that it does not permit the cut clippings to be directed into a catcher nor does it permit the clippings to be blown laterally from the housing 10, and the grass clippings can drop and are blown downwardly from the housing 10 and into the grass or turf below the housing and within the projected limits of the lower edge 27 which is substantially horizontally disposed at an elevation above the ground line G, depending upon the adjustment of the mower wheels 11.

For propelling and guiding the mower, a pulley 28 is on the engine shaft 18 and a drive belt 29 extends from the pulley 28 and to a pulley 31 which in turn connects with the drive shaft 32 rotatably mounted at the rear portion of the housing 10. That is, through a conventional arrangement of a drive mechanism interconnected between the pulley 31 and the drive shaft 32, the drive shaft 32 is rotated under the power of the engine 17. In turn, the mower rear wheels 11 are driven by the shaft 32, and thus the mower is of a conventional type of a self-propelled mower operating under the power of the engine 17, and this can be accomplished in any conventional manner. In fact, the mower could be a manual or nonself-propelled type, as far as this invention is concerned and as described hereinafter. Also, an operator's handle 33 is connected to the mower housing by means of a pin 34, and thus the operator can guide and push and pull the mower, as needed and as desired.

Accordingly, to this point of the verbal description heretofore presented, the rotary mower is generally of a conventional type and it has the complete enclosure of the housing by means of the skirt 24 and it has the arrangement of the two blades 21 and 22, all as described in the aforementioned. With that arrangement, the mower is of a mulching type in that it contains the cut clippings within the housing 10 and it actually causes them to be cut into short lengths so that the clippings can be dispersed into the remaining turf over which the mower is moving, and the remainder of the combination of elements of this invention is described hereinafter and it will therefore become clear as to how the clippings are finally disposed of without the need for a catcher or blowing them laterally from the housing or ultimately raking them from the grass or turf. Also, as previously mentioned, anyone skilled in the art will understand the construction of the mower housing 10 and the wheel adjusting elements, including the crank mounting 12 and the adjusting lever 16, and this can be in any conventional arrangement, such as that shown in U.S. Pat. No. 3,056,249. Also, the self-propelling apparatus of the mower is of a conventional nature and can be readily understood by anyone skilled in the art in that the engine or prime mover drives the pulley 28 and the belt 29 and the driven pulley 31 which engages the necessary drive members or gears or the like in the box designated 36 wherein the driven members therein are in driving relation with the drive shaft 32, and such is conventional for propelling the mower rear wheels 11.

FIGS. 1 and 2 also show that the mower is thus moved in a fore-and-aft direction which has the axis coincident with the arrow designated F which actually designates the forward direction of the mower. Thus the mower housing 10 has a lateral width or span designated by the letters S on opposite sides of the housing 10 in FIG. 2, and an important feature of the entire arrangement is the provision of the grass combing member 37 affixed to the rear portion of the housing 10 and actually on a rear platform designated 38 extending rearwardly and integrally as a part of the housing 10. Thus the comb member 37 extends laterally or across the width of the mower itself and extends for substantially the width of the swath formed by the rotation of the longer cutting bar 21, and the comb member 37 is affixed to the housing, such as by means of the screws 39 extending through the housing platform portion 38 and through the intermediate portion of the comb member 37 which is actually shown to be an inverted U-shaped member, as seen in FIG. 1 and in FIG. 5 where it is shown alone.

Thus all of the drawings show the comb member 37, and the member is of the U-shape mentioned and has a rearwardly disposed panel portion or section 41 and a forwardly disposed panel portion or section 42, and both of the panels 41 and 42 depend downwardly from the intermediate portion 43 of the comb member 37, and thus they extend to a level below the mower housing lower edge 27, as seen in FIG. 1.

The member 37 is made of an elastomer, such as a polyvinylchloride material, and panels 41 and 42 are flexible, and the panel 43 has greater flexibility than does the panel 42. That is, the panel 41 may be provided with either a thinner configuration or with grooves 44, either of which can provide for the greater flexibility in the panel 41. Also, the intermediate portion 43 of the comb member 37 is made to be more rigid than is either of the panels 41 and 42, and thus that portion or intermediate mounting section 43 is suitable for mounting underneath the mower platform 38, and by means of the screws 39, as described above, and of course the screws 39 can thus extend through a screw opening 46 in the member portion 43, for affixing the member 37 to the mower, as shown.

Thus, the panels 41 and 42 terminate in respective lower edges 47 and 48, and the edge 47 is at an elevation lower than that of the edge 48, in the free and unflexed position of the member 37, such as shown in FIG. 5 and also even as shown in the mower position of FIG. 1. Accordingly, the edge 47 will slide over the turf or grass in the fore-and-aft movement of the mower, and thus the panel 41 is available for combing the grass and thus dispensing the clippings into the grass or turf in the forward movement of the mower. More importantly, the panel 42 extends downwardly toward the ground line G, as shown in FIG. 1, and that panel 42 is presented for initial and primary combing or brushing the grass clippings into the remaining grass or turf, to thus dispose of the grass clippings. That is, the panels 41 and 42 work in the nature of double panels with the grass clippings being first engaged by the forwardly and shorter disposed panel 42 which initially and primarily brushes the cut clippings into the grass, and then the panel 41 next engages the clippings and secondarily further brushes them into the grass so that there is no need for catching the clippings or raking them from the lawn.

FIGS. 2 and 3 also show that the lower edge 47 of the panel 41 may be of a serrated or wavy nature, as indicated by the irregular lines designated 49, and thus the brushed grass clippings are free to move laterally, as well as in the fore-and-aft mower direction, even though the panel 41 is moving only forwardly when the mower is moving forwardly. Therefore, the comb edge or wavy edge 49 produces a combing action. Also, FIG. 5 shows that the member 37 is actually of three initial portions, namely the panels 41 and 42 and the intermediate portion 43, and those three portions are affixed together in an integral arrangement, such as by extruding the portions which are then bonded together. In actuality, the panels 41 and 42 are of approximately 1/10 of an inch in thickness, with the panel 42 being slightly thicker, and the panel 41 is approximately thrice the downward length of the panel 42, and the panel 42 is approximately one inch from the top of the intermediate member 43, and the panel 41 is approximately 3½ inches from the top of the intermediate member 43. Also, if the member 37 were removed from the mower and held in a position to have the panels 41 and 42 substantially horizontally disposed, the flexibility of the panel 41 is such that it will deflect or bend from the horizontal alignment and under its own weight, and that is when the intermediate member 43 is of a vertical orientation, rather than the horizontal orientation shown in FIG. 5. However, the panel 42 will not so bend under its own weight.

As such, the member 37 presents two panels or drag flaps 41 and 42, and the location of the mounting of the member 37 on the mower, and the size of the member 37, are such that the panel lower edge 47 will be either in contact with the ground line G or very close thereto, even when the mower wheel is adjusted so that the housing 10 is at its highest elevated position. However, the panel lower edge 48 will always be above the ground line G, in all the mower adjusted positions. Further, it can be said that the material and thickness of the panel 42 renders it effectively inflexible relative to the flexibility of the panel 41, and that means that in the movement of the mower over the ground, the rigidity or inflexibility of the panel 42 is such that it will not flex when it engages the grass clippings or the turf grass. Because of the length, rigidity, and forward location of the panel 42, it then is the primary comb for the clippings, all relative to the characteristics of the panel 41. Also, the panel 42 could be used alone, for the purpose of its effect of combing, without the panel 41, and it is part of the housing 10.

The cutter includes the two cutter bars 21 and 22, with the bars having respective cutting ends 21' and 22'. The end 21' is pitched upwardly relative to its direction of rotation A to create an upward movement of the air and the cut clippings. The housing 10 is slightly arcuate in the circular area above bar end 21', to deflect the clippings radially inwardly and toward the blade end 22' which re-cuts the clippings into shorter lengths. The bars 21 and 22 have respective downward pitched portions at substantially the same radius, as indicated at 21" and 22', to create a downdraft of air and clippings at that radii, and thus blow the clippings down into the turf.

What is claimed is:

1. A mulching type of lawn mower comprising a mower housing having an endless skirt extending therearound and toward the ground and terminating in a lower endless edge on substantially a horizontal plane, wheels on said housing for supporting said housing in a fore-and-aft axis of mower movement, a grass cutter rotatably mounted on said housing and disposed within the confines of said endless skirt and at a level above that of said lower edge for cutting the grass clippings in a swath of a width defined by said cutter in the fore-and-aft movement of said housing, said cutter having pitched portions for blowing said clippings downwardly and into the turf, a prime mover on said housing for rotating said cutter and to thereby cut the grass located within the confines of said skirt, and a panel rigidly affixed to said housing and extending thereacross and in an upright plane for the width of said swath in the direction transverse to said fore-and-aft axis and at the rear of said housing relative to said fore-and-aft axis, and said panel extending downwardly from said housing and terminating in a lower edge at an elevation lower than and rearwardly of said lower endless edge of said housing and is spaced above the ground for brushing said grass clippings and thereby brush them into the lawn in the forward cutting movement of the mower.

2. The mulching type lawn mower as claimed in claim 1, wherein said panel is of a flexible material for displacing said lower edge thereof relative to said fore-and-aft axis in response to any resistance of the ground and turf on said panel.

3. The mulching type lawn mower as claimed in claim 2, including wheel adjusting mountings interposed between said housing and said wheels for vertically adjustable positioning of said housing and said panel relative to the ground.

4. The mulching type lawn mower as claimed in claim 1, wherein said panel lower edge is of an irregular shape and presents a wavy edge for combing the grass clippings into the lawn.

5. The mulching type lawn mower as claimed in claim 1, including an additional panel affixed to said housing and extending thereacross at the rear of said housing and rearwardly of the first-mentioned said panel and extending downwardly and terminating in a lower edge at an elevation lower than the elevation of said lower edge of the first-mentioned said panel, for engaging the grass clippings after the first-mentioned panel engages the grass clippings in the forward mowing movement of the lawn mower.

6. The mulching type lawn mower as claimed in claim 5, wherein said first-mentioned panel is less flexible relative to the flexibility of the additional said panel.

7. The mulching type lawn mower as claimed in claim 5, including wheel adjusting mountings interposed between said housing and said wheels for vertically adjustable positioning of said housing and said panels relative to the ground, said mountings and the disposition of the respective said lower edges of said panels being arranged relative to the upper and lower limits of adjustment of said wheels such that said lower edge of the first-mentioned said panel is spaced above the elevation of the ground when said wheels are in the maximum position of having said housing lowered, and said lower edge of the additional said panel is at the elevation of the ground when said wheels are in the maximum position of having said housing raised.

8. The mulching type mower as claimed in claim 1, wherein said grass cutter comprises a plurality of cutting blades with some thereof disposed at an elevation for cutting the grass from the turf and the other thereof disposed radially inwardly from said some blades for re-cutting the grass clippings cut off by said some blades.

9. The mulching type mower as claimed in claim 1, wherein said cutter comprises two cutting bars angularly disposed to each other and of different lengths and having pitched portions for creating a downdraft of clippings.

* * * * *